United States Patent
Krefeld et al.

(10) Patent No.: US 10,145,437 B2
(45) Date of Patent: Dec. 4, 2018

(54) VALVE DEVICE FOR AN AIR SPRING STRUT

(71) Applicant: ThyssenKrupp Bilstein GmbH, Ennepetal (DE)

(72) Inventors: Andreas Krefeld, Düsseldorf (DE); Damian Mrugalla, Dortmund (DE)

(73) Assignee: THYSSENKRUPP BILSTEIN GMBH, Ennepetal (DE)

( * ) Notice: Subject to any disclaimer, the term of this patent is extended or adjusted under 35 U.S.C. 154(b) by 0 days.

(21) Appl. No.: 15/110,604

(22) PCT Filed: Jan. 8, 2015

(86) PCT No.: PCT/EP2015/000017
§ 371 (c)(1),
(2) Date: Jul. 8, 2016

(87) PCT Pub. No.: WO2015/104215
PCT Pub. Date: Jul. 16, 2015

(65) Prior Publication Data
US 2016/0327115 A1    Nov. 10, 2016

(30) Foreign Application Priority Data
Jan. 9, 2014    (DE) .......................... 10 2014 100 166

(51) Int. Cl.
*B60G 17/052*    (2006.01)
*F16F 9/34*    (2006.01)
(Continued)

(52) U.S. Cl.
CPC ................ *F16F 9/34* (2013.01); *B60G 11/27* (2013.01); *B60G 15/067* (2013.01); *F16F 9/04* (2013.01);
(Continued)

(58) Field of Classification Search
CPC .... F16F 9/04; F16F 9/34; B60G 11/27; B60G 11/62; B60G 15/062; B60G 15/12;
(Continued)

(56) References Cited

U.S. PATENT DOCUMENTS

| 4,934,667 A | 6/1990 | Pees et al. |
| 5,141,210 A * | 8/1992 | Bauer .................. F16F 9/0245 137/625.12 |

(Continued)

FOREIGN PATENT DOCUMENTS

| CN | 101654054 A | 2/2010 |
| CN | 203202104 U | 9/2013 |

(Continued)

OTHER PUBLICATIONS

English abstract of DE102009036554A.
(Continued)

*Primary Examiner* — Thomas W Irvin
(74) *Attorney, Agent, or Firm* — thyssenkrupp North America, Inc.

(57) ABSTRACT

Disclosed is a valve device for an air spring strut of an air suspension system of a motor vehicle, having a valve unit and a housing which receives the valve unit and has a bearing face for mounting a head bearing of the air spring strut on the valve device. The housing has a surface section for supporting the valve device in the air spring strut in a positively locking manner, with the result that a force which is exerted by the head bearing on the valve device can be introduced via the housing into the air spring strut. A supporting section is configured on the surface section of the housing, onto which supporting section an exchange element which can be disconnected from the housing can be (Continued)

arranged from the direction of a center longitudinal axis of the valve device for supporting on the housing in a positively locking manner.

14 Claims, 4 Drawing Sheets

(51) Int. Cl.
*F16F 9/04* (2006.01)
*B60G 11/27* (2006.01)
*B60G 15/06* (2006.01)
*B60G 11/62* (2006.01)
*B60G 15/12* (2006.01)

(52) U.S. Cl.
CPC .............. *B60G 11/62* (2013.01); *B60G 15/12* (2013.01); *B60G 2202/152* (2013.01); *B60G 2204/1262* (2013.01)

(58) Field of Classification Search
CPC ............ B60G 17/0485; B60G 17/0523; B60G 2202/152; B60G 2204/1262
USPC .................................. 267/242, 64.27, 64.28
See application file for complete search history.

(56) References Cited

U.S. PATENT DOCUMENTS

| 5,678,810 | A  * | 10/1997 | Summers, III | B60G 17/0521 267/220 |
| 6,173,738 | B1 | 1/2001 | Opara et al. | |
| 6,536,749 | B1 * | 3/2003 | Luhmann | B60G 15/12 267/220 |
| 6,910,682 | B2 * | 6/2005 | Fritz | B60G 15/12 267/35 |
| 7,959,138 | B2 * | 6/2011 | Leonard | F16L 37/008 267/122 |
| 8,376,327 | B2 * | 2/2013 | Lee | B60G 15/10 267/113 |
| 8,973,932 | B2 * | 3/2015 | Pielock | F16F 9/049 280/124.157 |
| 9,616,726 | B2 * | 4/2017 | Harla | B60G 11/27 |

FOREIGN PATENT DOCUMENTS

| DE | 198 54 540 A1 | 6/2000 |
| DE | 102 25 354 A1 | 1/2004 |
| DE | 102009036554 A | 7/2010 |
| DE | 10 2012 200389 A1 | 7/2013 |
| WO | 2013/050385 A1 | 4/2013 |

OTHER PUBLICATIONS

English abstract of CN203202104U.
English abstract of CN101654054A.
German language International Search Report for PCT/EP2015/000017, dated Apr. 30, 2015.
English Translation of the International Search Report for PCT/EP2015/000017, dated Apr. 30, 2015.
English translation of abstract for DE 102 25 354 A1.
English translation of abstract for DE 10 2012 200389 A1.

* cited by examiner

VALVE DEVICE FOR AN AIR SPRING STRUT

CROSS REFERENCE TO RELATED APPLICATIONS

This application is a U.S. National Stage Entry of International Patent Application Serial Number PCT/EP2015/000017, filed Jan. 8, 2015, which claims priority to German patent application no. DE 102014100166.4 filed Jan. 9, 2014, the entire contents of both of which are incorporated herein by reference.

FIELD

The present disclosure relates to an air spring strut, and a valve device for an air spring strut, of an air suspension system of a motor vehicle.

BACKGROUND

In air suspension systems for motor vehicles, there is the aim in some applications for it to be possible to set the properties of the air suspension system in a manner which is as simple as possible. An air suspension system has an air spring strut with a multiplicity of different components which have an effect on the properties of the air suspension system, for example the size or the material of an air spring pot or a rolling bellows which rolls on a rolling tube during compression and during rebound, or the configuration of a valve, in particular a pressure holding valve for determining the pressure in a pressure space of the air spring strut which is formed in the air spring pot and which is delimited movably by the rolling bellows. Here, an inflow or outflow of air into or out of the pressure space can be regulated via the valve. Here, the properties of the air spring system can also be set by way of a head bearing which is arranged in the air spring strut, in particular by way of a mechanical prestress which is exerted on the head bearing. A prestress of this type can be set by means of the arrangement of the valve device in the air spring strut in contact with the head bearing. The valve device can be brought into contact, for example, with the head bearing under prestress, in order to exert a force in the axial direction, that is to say in the direction of a center longitudinal axis of the air spring strut or head bearing, on the head bearing. Here, a pilot pressure can be exerted on an elastic part of the head bearing, by an underside of a housing of the valve device being brought into contact with the elastic part. Here, the valve device is seated above the head bearing in the air spring strut and comprises a valve unit which is received in a housing and via which the pressure in a pressure space of the air spring strut can be held, the housing being in contact with the head bearing.

Here, known housings are configured, for example, from a material which is designed for great surface pressures, for example formed as a metallic cast part, in particular made from aluminum.

Patent document DE 198 54 540 C2 describes a pressure holding valve for air suspension systems, in which pressure holding valve a valve member in the form of a diaphragm is arranged in a housing.

Laid-open specification DE 102 25 354 A1 describes a head bearing of a motor vehicle spring strut.

BRIEF DESCRIPTION OF THE DRAWINGS

The present disclosure is described in detail below with reference to the attached drawing figures, wherein.

DETAILED DESCRIPTION

In one aspect of the present disclosure a valve device is disclosed that can be used in a spring strut in a flexible way. In particular, a valve device is disclosed through which a prestress that is to be exerted on a head bearing of an air spring strut may be set. Furthermore, the valve device of the present disclosure may use a standardized housing with an identical configuration for air spring struts of different specifications A valve device of the present disclosure includes a valve unit and a housing which receives the valve unit and has a bearing face for mounting a head bearing of the air spring strut on the valve device. The housing of the valve device includes a surface section for supporting the valve device in the air spring strut in a positively locking manner, with the result that a force which is exerted by the head bearing on the valve device can be introduced via the housing into the air spring strut.

The invention includes the technical teaching that a supporting section is configured on the surface section of the housing, onto which supporting section an exchange element which can be disconnected from the housing can be arranged from the direction of a center longitudinal axis of the valve device for supporting on the housing in a positively locking manner, the housing being configured from plastic at least in the region of the surface section.

A plastic housing or a housing of the valve device which is manufactured at least partially from plastic can be of inexpensive configuration. Simple manufacturing methods can be selected, in particular with regard to large unit numbers and short manufacturing times. In contrast to, for example, high pressure die cast aluminum housings, a plastic housing can be manufactured in a simpler, less expensive way, for example by way of plastic injection molding methods.

The valve device advantageously does not have to be adapted to the installation geometry in the air spring strut, and a standardized valve device can be used for different air spring struts, since, according to the invention, the exchange element forms an adaptable small part which has an interface geometry with respect to the valve device which is always identical and, furthermore, can be adapted geometrically to the installation situation in the air spring strut regardless of the interface geometry.

It is advantageous in this way that the type of support of the head bearing in the air spring strut also does not have to be changed if a standardized valve device is to be capable of being installed into air spring struts with different specifications. The different specifications can be achieved in an otherwise identical valve device and identical air spring strut, for example, by virtue of the fact that exchange elements with different geometric dimensions are used.

Thus, for example, the head bearing can be prestressed to a different magnitude in the case of exchange elements of different thickness, and the exchange element can have the same surface contour at the interface to the air spring strut as, for example, previously known housings which are supported directly on the air spring strut, that is to say without an exchange element mounted in between. Here, the material selection in the case of the exchange element is largely free. The exchange element can be configured, for example, from a particularly dimensionally stable, pressure resistant and/or hard material, in particular a metal such as steel or aluminum.

The housing can have a solid main body, in which a valve unit with functional elements for pneumatic functions is integrated. Here, a valve unit is preferably to be understood to mean a core component within the housing of the valve device made from plastic, by means of which core component an inflow or outflow of gas between the surroundings and the air spring strut can be regulated, whether electronically or, for example, mechanically.

In the present case, an exchange element is to be understood to mean an individual component which forms a separate part which can be handled and manufactured independently of the housing, in particular made from a different material than the housing. The exchange element can be configured, for example, as a disk, as a ring or as a plate and preferably has a large contact area, by means of which it can be brought into contact with the housing. The material of the exchange element preferably has a higher compressive strength and/or a greater hardness than the material of the housing.

Furthermore, the supporting section preferably has a shoulder or forms a shoulder which defines a position of the exchange element relative to the housing, and centers the latter, in particular, in the radial direction. As a result, the exchange element can be coupled in a simple, predefined way in a defined position to the housing. Furthermore, a centering means is preferably provided on an inner side of the shoulder, the centering means corresponding with an inner circumferential face of the exchange element. Furthermore, the shoulder is preferably formed by way of a recess on an outer circumference of the housing.

A receptacle for arranging a sealing element for gas-tight sealing of an interface between the valve device and the air spring strut, in particular an inner circumferential face of an air spring pot of the air spring strut, is advantageously arranged on the housing. The sealing element can cause a gas exchange with the pressure space to take place exclusively via the valve unit in the valve device. Here, the sealing element is preferably arranged between the bearing face and the exchange element.

According to one advantageous exemplary embodiment, the housing has a plurality of ribs which are configured from plastic and which preferably extend in the radial direction between the center longitudinal axis and the supporting section. As a result, a rigid housing can be provided with a low material usage. Here, the ribs can preferably be arranged in a uniformly distributed manner about the center longitudinal axis, as a result of which a symmetrical distribution of force in the housing can be ensured.

Furthermore, the shoulder is preferably configured on the ribs or webs which extend radially to the outside, the ribs preferably having an upper side which is arranged obliquely in relation to the center longitudinal axis. As a result, the exchange element can be coupled to the supporting section in a simple way, in particular by the upper sides of the ribs guiding the exchange element into the radially oriented position during plugging onto the shoulder.

According to one advantageous exemplary embodiment, the supporting section is arranged in a radially outer edge region of the housing, preferably in a manner which adjoins an outer circumferential face of the housing. As a result, the exchange element can be arranged on the housing in such a way that the force can be transmitted in the axial direction in a radially outer edge region of the housing onto the air spring strut. This makes it possible, for example, to retain the previous construction of the receptacle which is provided for the valve device in the air spring strut.

According to one advantageous exemplary embodiment, the exchange element is arranged on an upper side of the housing in a manner which lies opposite the bearing face. As viewed from the head bearing, this arrangement can also be described as a series arrangement. As a result, the exchange element can be arranged in a simple way in the force flow path between the housing and the receptacle in the air spring strut.

According to one advantageous exemplary embodiment, the valve device has the exchange element, the supporting element preferably being arranged on an upper side of the valve device in such a way that the exchange element can be plugged or placed onto the valve device in the axial direction.

According to one advantageous exemplary embodiment, the exchange element has a preferably annular supporting face which corresponds with the supporting section and is annular. As a result, a symmetrical introduction of the supporting force into the air spring strut can take place, and the supporting force can be distributed over a comparatively large area in the case of an annular or disk-shaped supporting face, with the result that only a small surface pressure is caused on the housing.

The supporting face is preferably oriented at least approximately orthogonally with respect to the center longitudinal axis of the valve device, with the result that supporting forces can be transmitted at least substantially in the axial direction. Here, "at least approximately" or "substantially" is preferably to be understood to mean an orientation, in the case of which the angle with respect to the center longitudinal axis lies in the range from 75 to 105°, further preferably from 85 to 95°.

According to one advantageous exemplary embodiment, the exchange element has a preferably concavely configured counterbearing face, via which the exchange element can be supported in the air spring strut in a positively locking manner, the counterbearing face being configured at a predefined axial spacing from the supporting face, and the counterbearing face preferably being arranged in the transition into an outer circumferential face of the exchange element and therefore forming the edge region. As a result, support can take place on a supporting element, for example in the form of a wire ring.

In other words, the valve device is mounted in a prestressed manner via the supporting element in a receptacle on the air spring strut between the supporting element and the head bearing, under a prestress which is forwarded via the exchange element and in a manner which is dependent on the thickness of the exchange element or the axial spacing between the supporting face and the counterbearing face of the exchange element, the receptacle being configured in such a way that different geometrical configurations of the exchange element can be received in the receptacle.

A supporting element, in particular a supporting ring, for example a wire ring, can be brought into contact with the counterbearing face, which supporting element can be installed and dismantled easily for assembly and for dismantling. In other words, the counterbearing face can be brought into contact with a supporting element which is arranged on the air spring strut in a stationary manner. The supporting element can absorb the forces which are exerted by the head bearing on the valve device and can forward them into the air spring strut, in particular via one or more projections which is/are configured on the air spring pot of the air spring strut and, for example, projects/project radially to the inside.

Here, a counterbearing face is to be understood to mean a bearing or a face which is set up to forward the supporting forces which are exerted on the housing by the head bearing into the air spring strut and to transmit them to the air spring strut even in the case of comparatively great surface pressure forces.

An edge is preferably formed between an outer circumferential face of the exchange element and the counterbearing face, with which edge the supporting element which is arranged in a receptacle of the air spring strut which is provided for the valve device can be brought into contact. The counterbearing face is further preferably arranged at an angle of at least approximately 90° with respect to the outer circumferential face in the region of the edge or adjoining the outer circumferential face. As a result, a type of projection or shoulder can be formed, by means of which the exchange element can be anchored satisfactorily relative to the supporting element.

The exchange element preferably has a predefined thickness in relation to the axial direction, the thickness being defined by the spacing between the supporting face and the end side or a counterbearing face. As a result, a prestress which is exerted on the head bearing can be set in a simple and exact way even in the case of an unchanged housing geometry of the valve device. The end side is preferably oriented at least in sections approximately parallel to the supporting face. The absolute thickness of the exchange element is further preferably defined by the axial spacing of the end side or a section of the end side from the supporting face.

According to one advantageous exemplary embodiment, the supporting section is greater in terms of surface area than the counterbearing face. As a result, the same supporting force can be transmitted with a lower surface pressure between the housing and the exchange element than between the exchange element and the supporting element, with the result that the housing can also be configured from a plastic which is softer and/or less resistant to surface pressure in comparison to the exchange element and, for example, is particularly inexpensive.

The object is also achieved by way of a valve arrangement having a valve device according to the invention, the valve arrangement having a supporting element which is set up to secure the head bearing in the axial direction on an air spring pot of the air spring strut in a predefined way by means of the exchange element, in particular as a function of the thickness with an extent in the axial direction of the exchange element.

The driving behavior of the motor vehicle, for example, can be set via the magnitude of the prestress. Thanks to different exchange elements, that is to say exchange elements which are of largely identical configurations but in each case have a specific thickness, the prestress can be set in a particularly simple way. An adequate exchange element for a desired prestress can be selected, without further modifications to the construction or the arrangement of the components with respect to one another being necessary. To this end, only three components are required according to the invention, namely the housing of the valve device, the exchange element and the supporting element.

The object is also achieved by way of an air spring strut having a valve device according to the invention and having the exchange element and having a head bearing, the air spring strut having a supporting element, on which the positively locking support is secured, and the exchange element forming a coupling between the supporting element and the surface section of the housing.

According to one advantageous exemplary embodiment, the air spring strut has an air spring pot with a bulge and a projection, a supporting element of the air spring strut being arranged between the bulge and the projection, and the exchange element being mounted or supported in the axial direction on the supporting element. As a result, a receptacle of simple construction for the supporting element or the valve device can be provided, on which the supporting element or the exchange element and the valve device can be mounted in a positively locking manner.

Figure 1:
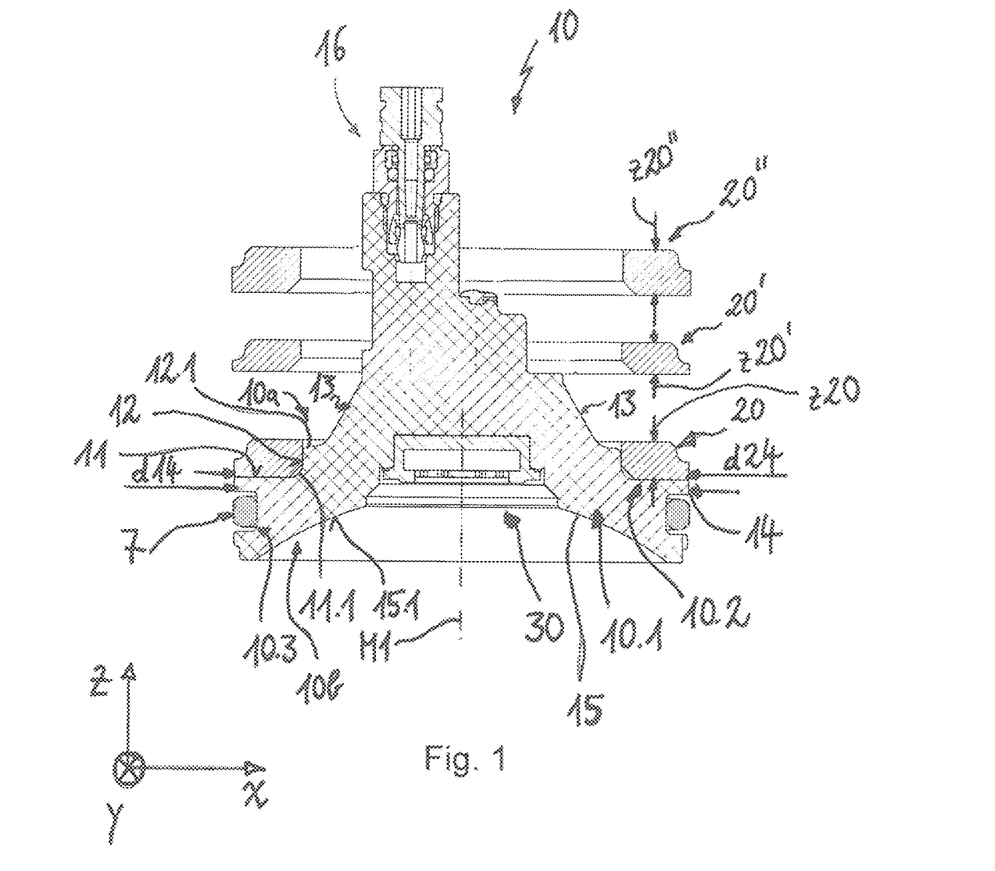
FIG. 1 is a cross section view of an embodiment of a valve device of the present disclosure, having an embodiment of an exchange element that is arranged thereon, as well as two additional exchange elements that may selectively be used as alternate exchange elements.

FIG. 1 shows a valve device 10 having a housing 10.1, on which a receptacle 10.3, in particular a circumferential groove, for a sealing element 7, in particular a sealing ring, is configured. The housing 10.1 surrounds a valve unit 30. A surface section or shoulder 10.2 is configured on the housing 10.1 on an upper side 10a of the housing 10.1, on which surface section or shoulder 10.2 an exchange element 20 is arranged. The shoulder 10.2 is arranged circumferentially on an outer circumferential face 14 of the housing 10.1, in particular concentrically about a center longitudinal axis M1 of the valve device 10.

The shoulder 10.2 has a supporting section 11 which is arranged at least approximately orthogonally with respect to the center longitudinal axis M1, that is to say in the x-direction, in particular in the form of an annular face. The supporting section 11 is arranged at least approximately orthogonally with respect to a preferably circumferential centering means 12, and a bevel or an inner radius 11.1 is configured in between. The centering means 12 adjoins individual webs or ribs 13 of the housing 10.1, and a bevel or an outer radius 12.1 is configured in between.

The exchange element 20 can be centered on the centering means 12 and can be positioned in a stationary manner relative to the housing 10.1 on the supporting section 11 in the axial direction in a predefined axial position. Here, an outer circumferential face of the exchange element 20 can be arranged flush with the outer circumferential face 14. In other words, the outer circumferential face 14 has a diameter d14 which corresponds at least approximately to the diameter d24 of the outer circumferential face of the exchange element 20, and is preferably equally great.

The exchange element 20 has a thickness z20 which is defined by a maximum spacing between the two end sides of the exchange element.

FIG. 1 shows two further exchange elements 20', 20" which in each case have a defined thickness z20', z22' in the axial direction of the center longitudinal axis M1. The three exchange elements 20, 20', 20" all have a different thickness. The valve device can be coupled to one of said exchange elements, depending on the application.

Figure 4:
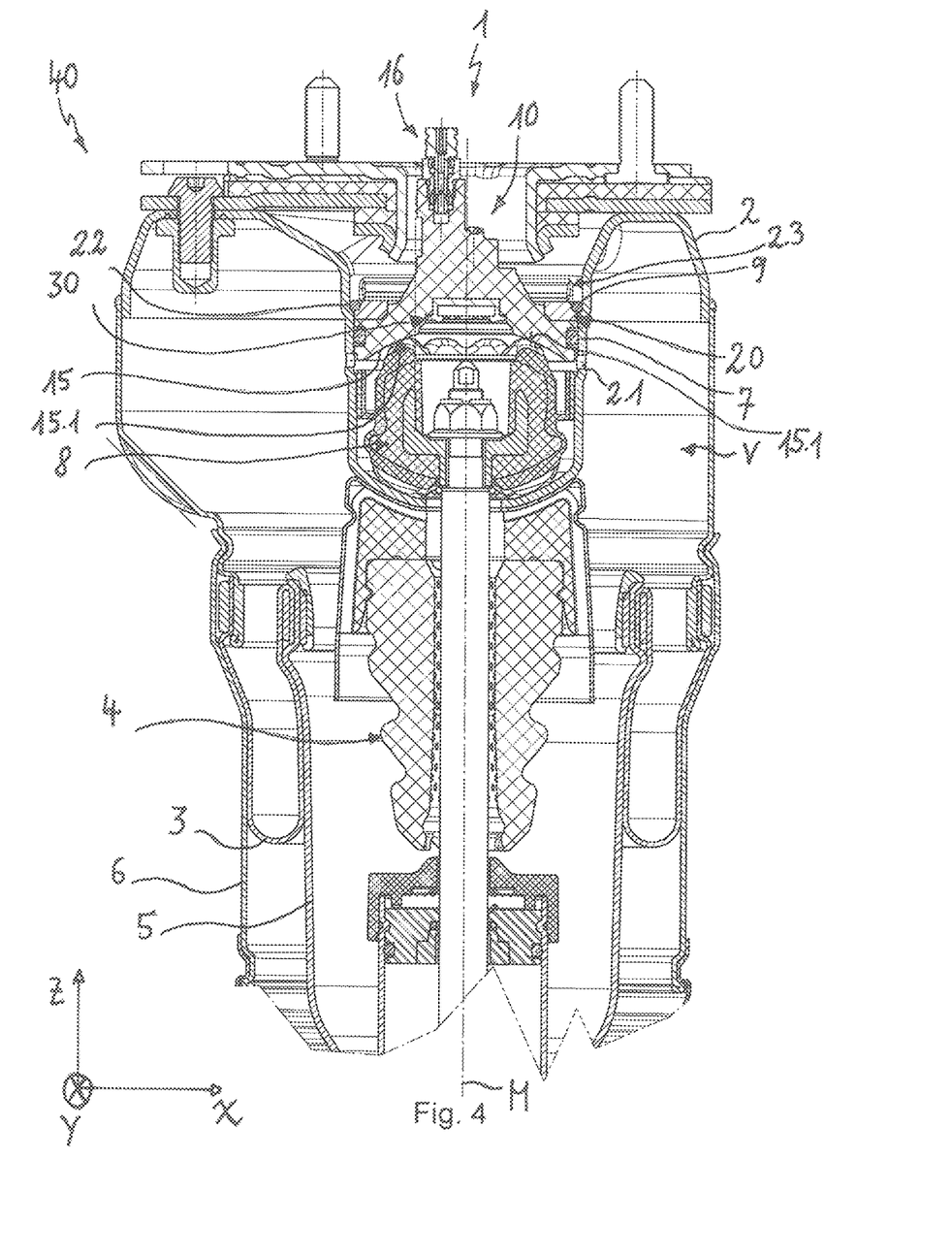
FIG. 4 is a cross section view of an embodiment of an air spring strut of a motor vehicle having an embodiment of a valve device of the present disclosure assembled therein.

Furthermore, the valve device 10 has an end-side bearing face 15 on an underside 10b, by means of which bearing face 15 the valve device 10 can be mounted on a head bearing of an air spring strut, as described in greater detail in conjunction with FIG. 4. As viewed in the z-direction, the end-side bearing face 15 is curved concavely inward. In an assembled state, a face section 15.1 of the bearing face 15 lies on the head bearing. Furthermore, the valve device 10 has an inlet or outlet 16, via which gas can be exchanged.

Figure 2:
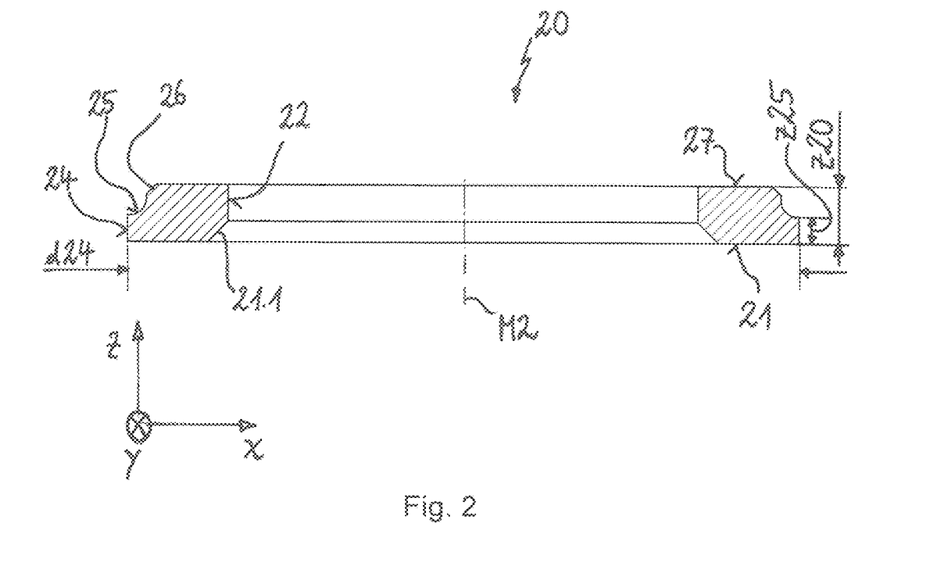
FIG. 2 is a cross section view of an embodiment of an exchange element of the present disclosure for use with the valve device of FIG. 1.

FIG. 2 shows one of the exchange elements 20 indicated in FIG. 1 in detail. The exchange element 20 has a supporting face 21 which is preferably oriented at least approximately orthogonally with respect to a center longitudinal axis M2 of the exchange element 20 in the x-direction. Furthermore, the exchange element 20 has a centering means or inner circumferential face 22, and an inner radius 21.1 or a bevel is arranged between the centering means 22 and the supporting face 21. An end side or end face 27 is configured so as to lie opposite the supporting face 21, which end side or end face 27 is preferably oriented in the x-direction at least approximately orthogonally with respect to a center longitudinal axis M2 of the exchange element 20, in particular parallel to the supporting face 21. The spacing between the supporting face 21 and the end side 27 defines a thickness z20 of the exchange element 20. The exchange element 20 has an outer circumferential face 24, on which a counterbearing or a counterbearing face 25 is configured. The counterbearing face 25 is curved concavely in the x-direction in the direction of the center longitudinal axis M2, in particular in the form of a circular segment. An outer radius 26 or a bevel is configured between the counterbearing face 25 and the end side 27. The counterbearing face 25 adjoins the outer circumferential face 24, an axial position of the counterbearing face being arranged at a spacing z25 from the supporting face 21.

Figure 3:
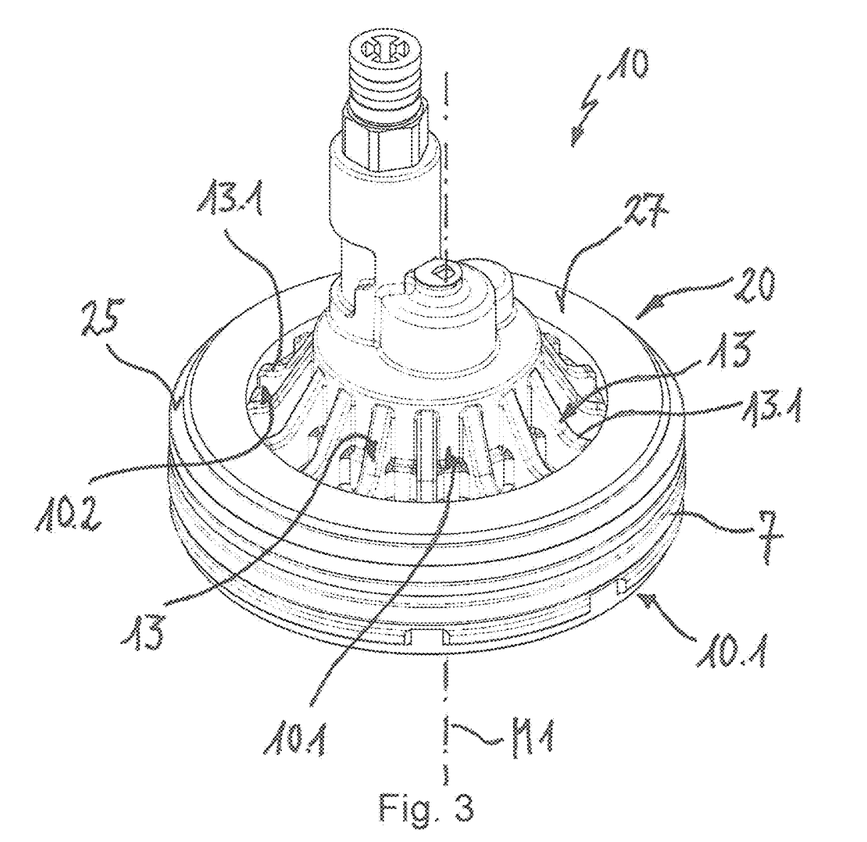
FIG. 3 is an isometric view of the valve device of FIG. 1.

FIG. 3 shows a perspective view of the arrangement and orientation of the ribs 13. The ribs 13 have an upper edge which is inclined obliquely outward in relation to the center longitudinal axis M1, which upper edges in each case lead toward the shoulder 10.2. The exchange element 20 can be plugged from above onto the housing 10.1 and can be guided in the process by way of the ribs 13 and can be guided toward the shoulder 10.2. The ribs 13 in each case flatten at the radially outer end and have an orientation which is at least approximately horizontal in sections, namely in a respective end section 13.1. The end side 27 protrudes beyond the end sections 13.1 in the axial direction. This can ensure that an, in particular, annular element which acts at the top on the end side 27 on the exchange element 20 does not come into contact with the housing 10.1.

FIG. 4 shows a valve arrangement 1 which is arranged on an air spring strut 40. The valve arrangement 1 has the valve device 10 with the valve unit 13 with the exchange element 20, and is mounted with the sealing element 7 on an inner circumferential face of an air spring pot 2 of the air spring strut 40. Furthermore, the air spring strut 40 has a head bearing 8 or a vibration-damping component of a head bearing which has properties of a damper. The valve device 10 comes into contact with the head bearing 8 by way of the end-side bearing face 15, in particular by way of a contact face section 15.1 which is, for example, annular depending on the shape of the head bearing. Furthermore, the air spring strut 40 has a support element 9, by means of which a prestress can be exerted on the head bearing 8, the prestress being transmitted by means of the valve device 10 to the head bearing 8, in particular in the form of an axial force counter to the z-direction.

The supporting face 21 of the exchange element 20 comes into contact with the supporting section 11 of the housing 10 in a region which is offset laterally outward in the radial direction with respect to the contact face section 15.1. The supporting face 21 and the supporting section 11 are annular and have a greater diameter than the contact face section 15.1. In other words, the exchange element 20 is arranged radially on the outside in relation to the contact face section 15.1 or the upper side of the head bearing 8 which corresponds therewith. As a result, forces can be forwarded along advantageously oriented force flow paths, in particular in conjunction with the concave, inwardly curved geometry of the bearing face. This arrangement also facilitates the exchange of the exchange element and the positively locking anchoring of the exchange element on the air spring strut.

The air spring pot 2 and the valve device 10 are arranged concentrically about a center longitudinal axis M. The air spring pot 2 defines a pressure space V which is connected to the valve unit 30 via a passage 2.1 or a plurality of passages: air or gas can be exchanged between the pressure space V and the valve unit 30, or a gas pressure can be transmitted from the pressure space V to the valve unit 30. Here, on its upper side, the head bearing 8 has a type of crown or a crown-like geometry, by means of which it is ensured that air can flow past between individual domes of the crown. Gas can be fed in or discharged via the inlet or outlet 16, and a gas pressure in the pressure space V can be set or regulated in conjunction with the valve unit 30.

A pressure bump stop 4 is arranged below the head bearing 8. Furthermore, the air spring strut 40 has a retaining cylinder 6 which surrounds a rolling piston 5. The retaining cylinder 6 and the rolling piston 5 are connected to one another via a rolling bellows 3.

The supporting element 9 is arranged on the exchange element 20, which supporting element 9 comes into contact both with a counterbearing face of the exchange element 20 and with a bulge 2.2 of an inner circumferential face of the air spring pot 2. The supporting element 9 can be configured, for example, as a wire ring. Furthermore, the air spring strut 40 or the air spring pot 2 has a projection 2.3, with which the supporting element 9 can come into contact in the axial direction. The projection 2.3 is arranged above the bulge 2.2, and the projection 2.3 preferably protrudes radially inward at least approximately by the same amount, by which the bulge 2.2 widens the inner circumferential face radially outward. The projection 2.3 preferably protrudes inward by an amount which is less than or equal to the amount, by which the bulge 2.2 protrudes outward. The supporting element 9 can be laid from above past the projection 2.3 below the projection 2.3. Here, the projection 2.3 is not shown in sectional form, but rather in a side view. In other words, the projection 2.3 is not circumferential, but rather is configured only in individual sections or part circular segments. As a result, the supporting element 9 can be pushed past the projection 2.3, in particular in a swiveled orientation, although the supporting element 9 has a greater external diameter than the internal diameter which is defined by an inner side of the projection 2.3. The supporting element 9 can then be positioned between the bulge 2.2 and the projection 2.3, in particular after the valve device 10 and the exchange element 20 have been pushed from above onto the head bearing 8.

In terms of its implementation, the invention is not restricted to the above-specified preferred exemplary embodiment. Rather, a number of variants are conceivable which make use of the described solution even in the case of embodiments of a fundamentally different type. In particular, the arrangement and geometry of the counterbearing face of the exchange element can differ from the variant which is shown, specifically in a manner which is dependent on the geometry of the supporting element. All of the features and/or advantages which are apparent from the claims, the description or the drawings, including structural details or spatial arrangements, can be essential to the invention both per se and in the widest variety of combinations.

LIST OF DESIGNATIONS

1 Valve arrangement
2 Air spring pot
2.1 Passage
2.2 Bulge
2.3 Projection
3 Rolling bellows
4 Pressure bump stop
5 Rolling piston
6 Retaining cylinder
7 Sealing element
8 Head bearing or vibration-damping component of the head bearing
9 Supporting element
10 Valve device, in particular pressure holding valve device
10.1 Housing
10.2 Surface section, in particular shoulder
10.3 Receptacle, in particular groove, for sealing element
10a Upper side of the housing
10b Underside of the housing
11 Supporting section, in particular support face
11.1 Inner radius or bevel
12 Centering means
12.1 Outer radius or bevel
13 Rib or web
14 Outer circumferential face
15 End-side bearing face
15.1 Face section
16 Inlet or outlet
20 Exchange element, in particular exchange ring
21 Supporting face
21.1 Inner radius or bevel
22 Centering means or inner circumferential face
24 Outer circumferential face
25 Counterbearing face
26 Outer radius or bevel
27 End face or end side
30 Valve unit
40 Air spring strut
d14 Diameter of the outer circumferential face of the valve device
d24 Diameter of the outer circumferential face of the exchange element
M Center longitudinal axis
M1 Center longitudinal axis of the valve device
M2 Center longitudinal axis of the exchange element
V Pressure space
z20 Thickness of the exchange element
z20' Thickness of the (further) exchange element
z20" Thickness of the (further) exchange element
z25 Predefined axial spacing; that is to say, axial position of the counterbearing face or spacing between the supporting face and the counterbearing face

What is claimed is:

1. A valve device for an air spring strut of an air suspension system of a motor vehicle, comprising:
a valve unit and a housing which receives the valve unit and has a bearing face for mounting a head bearing of the air spring strut on the valve device, the housing having a surface section for supporting the valve device in the air spring strut in a positively locking manner, with the result that a force which is exerted by the head bearing on the valve device can be introduced via the housing into the air spring strut, wherein a supporting section is configured on the surface section of the housing, onto which supporting section an exchange element which can be disconnected from the housing can be arranged from the direction of a center longitudinal axis of the valve device for supporting on the housing in a positively locking manner, the housing being configured from plastic at least in the region of the surface section, and wherein the exchange element has a predefined thickness, the extent of the predefined thickness determining a corresponding axial position of the housing in the air spring strut.

2. The valve device of claim 1, wherein the housing has a plurality of ribs that at least one of extend in the radial direction between the center longitudinal axis and the supporting section or that are arranged in a uniformly distributed circumferential manner about the center longitudinal axis.

3. The valve device of claim 1, wherein the supporting section is configured in a radially outer edge region of the housing.

4. The valve device of claim 1, wherein the supporting section is arranged on an upper side of the housing, which upper side is configured so as to lie opposite the bearing face.

5. The valve device of claim 1, wherein the valve device has the exchange element, the supporting section being configured on an upper side of the valve device in such a way that the exchange element can be plugged onto the valve device from the direction of the center longitudinal axis.

6. The valve device of claim 5, wherein the exchange element has a supporting face which corresponds with the supporting section, and is of annular configuration.

7. The valve device of claim 6, wherein the exchange element has a concavely configured counterbearing face, via which the exchange element can be supported in the air spring strut in a positively locking manner, the counterbearing face being arranged at a predefined axial spacing from the supporting face.

8. The valve device of claim 7, wherein the supporting section has a greater area than the counterbearing face.

9. An air spring strut of an air suspension system for a motor vehicle having a valve device as claimed in claim 1 and having a head bearing, wherein the air spring strut has a supporting element, via which a positively locking support of the head bearing is formed, the exchange element forming a coupling between the supporting element and the surface section on the housing of the valve device.

10. The air spring strut of claim 9, wherein the air spring strut has an air spring pot with a bulge and a projection, the supporting element being arranged between the bulge and the projection, and the exchange element being mounted on the supporting element in the axial direction.

11. The valve device of claim 1 wherein the supporting section is configured in a radially outer edge region of the housing in a manner that adjoins an outer circumferential face of the housing.

12. The valve device of claim 1, wherein the predefined thickness is the absolute thickness of the exchange element in the axial direction.

13. The valve device of claim 1, wherein the predefined thickness is the thickness of the exchange element measured from a supporting face configured to seat on the supporting section of the housing and a counterbearing face opposite the supporting face.

14. The valve device of claim 1, wherein the axial position of the housing in the air spring strut determines the amount of force exerted by the head bearing on the valve device.

* * * * *